United States Patent
Canright et al.

(10) Patent No.: US 7,493,320 B2
(45) Date of Patent: Feb. 17, 2009

(54) METHOD, SYSTEM, AND COMPUTER PROGRAM PRODUCT FOR RANKING OF DOCUMENTS USING LINK ANALYSIS, WITH REMEDIES FOR SINKS

(75) Inventors: Geoffrey Canright, Oslo (NO); Kenth Engø-Monsen, Fredrikstad (NO); Mark Burgess, Oslo (NO)

(73) Assignee: Telenor ASA, Fornebu (NO)

( * ) Notice: Subject to any disclaimer, the term of this patent is extended or adjusted under 35 U.S.C. 154(b) by 248 days.

(21) Appl. No.: 10/918,713

(22) Filed: Aug. 16, 2004

(65) Prior Publication Data

US 2006/0059119 A1    Mar. 16, 2006

(51) Int. Cl.
*G06F 7/00* (2006.01)
*G06E 3/00* (2006.01)

(52) U.S. Cl. .................. 707/5; 706/29; 707/10
(58) Field of Classification Search .............. 707/3; 706/29

See application file for complete search history.

(56) References Cited

U.S. PATENT DOCUMENTS

| | | | | |
|---|---|---|---|---|
| 5,889,999 | A * | 3/1999 | Breternitz et al. | 717/158 |
| 6,112,202 | A | 8/2000 | Kleinberg | |
| 6,112,203 | A | 8/2000 | Bharat et al. | |
| 6,182,065 | B1 | 1/2001 | Yeomans | |
| 6,285,999 | B1 | 9/2001 | Page | |
| 6,321,220 | B1 | 11/2001 | Dean et al. | |
| 6,353,825 | B1 | 3/2002 | Ponte | |
| 6,356,899 | B1 * | 3/2002 | Chakrabarti et al. | 707/5 |
| 6,457,028 | B1 | 9/2002 | Pitkow et al. | |
| 6,526,440 | B1 | 2/2003 | Bharat | |
| 6,560,600 | B1 | 5/2003 | Broder | |
| 6,591,261 | B1 | 7/2003 | Arthurs | |
| 6,665,665 | B1 | 12/2003 | Ponte | |
| 6,701,312 | B2 | 3/2004 | Lau et al. | |
| 6,799,176 | B1 * | 9/2004 | Page | 707/5 |
| 6,922,696 | B1 * | 7/2005 | Lincoln et al. | 707/101 |
| 6,993,475 | B1 * | 1/2006 | McConnell et al. | 704/7 |
| 6,999,963 | B1 * | 2/2006 | McConnell | 707/100 |
| 7,058,628 | B1 * | 6/2006 | Page | 707/5 |
| 7,178,112 | B1 * | 2/2007 | Ciolfi et al. | 716/1 |
| 7,188,106 | B2 * | 3/2007 | Dwork et al. | 707/5 |
| 7,231,399 | B1 * | 6/2007 | Bem et al. | 707/102 |

(Continued)

FOREIGN PATENT DOCUMENTS

JP    2001-319129    11/2001

(Continued)

OTHER PUBLICATIONS

Harary, Graph Theory, Dec. 1969, Addison-Wesley Publishing Co., P. V, 150-151, 198-211, 213, 226-227.*

(Continued)

*Primary Examiner*—Hosain T Alam
*Assistant Examiner*—Joseph D Wong
(74) *Attorney, Agent, or Firm*—Oblon, Spivak, McClelland, Maier & Neustadt, P.C.

(57) ABSTRACT

A method, device, and computer program product for ranking documents using link analysis, with remedies for sinks, including forming a metagraph from an original graph containing a link and a node; and one of reversing a link in the metagraph, and pumping a source in the metagraph.

22 Claims, 7 Drawing Sheets

U.S. PATENT DOCUMENTS

| | | | |
|---|---|---|---|
| 7,281,005 B2* | 10/2007 | Canright et al. | 707/5 |
| 2002/0038350 A1 | 3/2002 | Lambert et al. | |
| 2002/0129014 A1 | 9/2002 | Kim et al. | |
| 2002/0198869 A1 | 12/2002 | Barnett | |
| 2003/0003707 A1 | 1/2003 | Yamaha | |
| 2003/0037074 A1* | 2/2003 | Dwork et al. | 707/500 |
| 2003/0041041 A1* | 2/2003 | Cristianini | 706/12 |
| 2004/0006742 A1 | 1/2004 | Slocombe | |
| 2005/0060297 A1* | 3/2005 | Najork | 707/3 |
| 2005/0086260 A1* | 4/2005 | Canright et al. | 707/104.1 |
| 2005/0171946 A1* | 8/2005 | Maim | 707/5 |
| 2005/0256887 A1* | 11/2005 | Eiron et al. | 707/100 |
| 2006/0059113 A1* | 3/2006 | Kuznar et al. | 706/45 |

FOREIGN PATENT DOCUMENTS

| | | |
|---|---|---|
| WO | WO 01/84351 A2 | 11/2001 |
| WO | WO 03/098370 A2 | 11/2003 |

OTHER PUBLICATIONS

Cormen et al., Introduction to Algorithms, Dec. 2001, MIT Press, 2nd Ed., p. 520-522, 526, 528-531, 552-559, 581, 644-648.* xreferplus.com, definitions and contexts of "pumping source", Retrieved Jan. 30, 2006, p. 1-6.*

Oxford English Dictionary, Definition of "pumping", Dec. 1989, 2nd ed., p. 1-3.*

Kleinberg, "Authoritative Sources in a Hyperlinked Environment", Sep. 5, 1999, Journal of the ACM, p. 604-632.*

Kao et al., "Simple and Efficient Graph Compression Schems for Desnse and Complement Graphs", Journal of Combinatorial Optimization, Dec. 1998, Springer-Verlag, vol. 2, No. 4,p. 451-459.*

Ding et al., "PageRank, HITS and a Unified Framework for Link Analysis", Sep. 2002, LBNL Tech Report 49372, p. 1-12.*

Forman, "A Pitfall and Solution in Multi-Class Feature Selection for Text Classification", Jul. 4, 2004, 21st International Conference on Machine Learning, p. 1-9.*

Eiron et al., "Ranking the Web Frontier", May 17, 2004, WWWW2004, ACM Press, p. 309-318.*

Yuwono, et al., "Searching and Ranking Algorithms for Locating Resources on the World Wide Web", IEEE, p. 164-171.*

Ravi Kumar, Prabhakar Reghavan and Sridhar Rajagopalan and Andrew Tomkins (2002), The Web and Social Networks, pp. 32-36.*

R. Lempel et al., "The Stochastic Approach for Link-Structure Analysis (SALSA) and The TKC Effect"; Jul. 21, 2003; p. 1-23.*

Kazunari Sugiyama, Kenji Hatano, Masatoshi Yoshikawa and Shunsuke Uemura (2003), Refinement of TF-IDF Schemes for Web Pages using their Hyperlinked Neighboring Pages, pp. 198-207.*

R. Lempel and S. Moran (2001), Salsa: The Stochastic Approach for Link-Structure Analysis, pp. 131-160.*

Robert Endre Tarjan: Depth-First Search and Linear Graph Algorithms. SIAM J. Comput. 1(2): 146-160 (1972).*

Stuart K. Card, et al., "The WebBook and the Web Forager: An Information Workspace for the World-Wide Web"; Xerox Palo Alto Research Center: Apr. 13, 1996; pp. 111-113; CHI '96 Vancoouver; XP 000657809.*

Esko Nuutila, et al.; "On Finding the Strongly Connected Components In Directed Graph"; Laboratory of Information Processing Science Helsinki University of Technology, Otakaari 1, SF-02150 Espoo, Finland, pp. 1-14, 1994.*

Botafogo et al., "Structural Analysis of Hypertexts: Identifying Hierarchies and Useful Metrics", ACM Transactions on Information Systems, vol. 10, No. 2, Apr. 1992, pp. 142-180.*

Griffith et al., "The Structure of Scientific Literatures II: Toward a macro- and Microstructure for Science", Science Studies, 4 (1974), pp. 339-365.*

Larson, R.R., "Bibliometrics of the World Wide Web: An Exploratory Analysis of the Intellectual Structure of Cyberspace", Proceedings of the 1996 American Society for Information Science Annual Meeting, pp. 1-13.*

Small, H., "Co-citation in the Scientific Literature: A New Measure of the Relationship Between Two Documents", Journal of the American Society for Information Science, Jul.-Aug. 1973, pp. 265-269.*

Warry, EPO Office Action App No. 05784352.6-1225, Apr. 17, 2007.*

Feibing, Chinese_Patent_Office, Text of 1st Office Action, App_No_20050028110.8, May 30, 2008.*

Canright et al, "Roles in Networks", Science of Computer Programming, Jul. 17, 2004, Elsevier, p. 195,-214. <Retrieved from www.sciencedirect.com>.*

Xiaodi Huang, et al., "Identification of Clusters in the Web Graph Based on Link Topology", Proceedings of the Seventh International Database Engineering and Application Symposium (IDEAS'03), XP-010647158, Jul. 16, 2003, pp. 117-122.

Ricardo Baeza-Yates, et al., "Relating Web Characteristics with Link Based Web Page Ranking", String Processing and Information Retrieval, SPIRE 2001, XP-010583172, Nov. 13, 2001, pp. 21-32.

Zheng Chen, et al., "A Unified Framework for Web Link Analysis", Proceedings of the 3rd International Conference on Web Information Systems Engineering (WISE'02), XP-010632781, Dec. 12, 2002, pp. 63-70.

Michelangelo Diligenti, et al., "Web Page Scoring Systems for Horizontal and Vertical Search", Proceedings of the 11th International Conference on World Wide Web—WWW 2002, XP-002353433, May 7, 2002, pp. 508-516.

Brian D. Davison, "Unifying Text and Link Analysis", Eighteenth International Joint Conference on Artificial Intelligence, 'Online! 2003, XP-002353434, 2003, 3 pages.

Henry Lieberman; "Letizia: An Agent That Assists Web Browsing"; Media Laboratory, Proceedings of the Fourteenth International Joint Conference on Artificial Intelligence (IJCAI-95); 1995; Massachusetts Institute Of Technology.

R. Lempel et al., "The Stochastic Approach for Link-Structure Analysis (SALSA) and The TKC Effect"; Jul. 21, 2003: p. 1-23.

Krishma Bharat, "A Search Engine based on Expert Documents"; Aug. 27, 2003; pp. 1-4.

The PageRank Citation Ranking: Bringing Order to the Web; Jan. 29, 1998; p. 1-17.

Taher H. Haveliwala; "Efficient Computation of PageRank"; Stanford University; Oct. 18, 1999; pp. 1-15.

Esko Nuutila, et al.; "On Finding the Strongly Connected Components in Directed Graph"; Laboratory of Information Processing Science Helsinki University of Technology, Otakaari 1, SF-02150 Espoo, Finland, pp. 1-14.

Soumen Chakrabarti et al., "Mining the Link Structure of the World Wide Web"; Feb. 1999; p. 1-12.

Jon M. Kleinberg, "Authoritative Sources in a Hyperlinked Environment"; Journal of the ACM, vol. 46, No. 5; Sep. 1999; p. 604-632.

Chris Ding et al. "PageRank, HITS and a Unified Framework for Link Analysis", The Twenty-Fifth Annual International ACM SIGIR Conference on Research and Development in Information Retrieval; Aug. 11-15, 2002, p. 353-354.

Sergey Brin, Lawrence Page, "The anatomy of a large-scale hypertextual Web search engine", Computer Networks and ISDN Systems 30; 1998; pp. 107-117.

Allan Borodin et al., "Finding Authorities and Hubs From Link Structures on the World Wide Web"; May 1-5, 2001.

M. Burgess, G. Canright, and K. Engø-Monsen "Importance functions for directed graphs" (submitted to JACM on Mar. 1, 2004), Oslo University College, Cort Adelers gate 30,0254 Oslo, Norway, Telenor Research and Development, 1331 Fornebu, Norway, pp. 30.

* cited by examiner

METHOD, SYSTEM, AND COMPUTER PROGRAM PRODUCT FOR RANKING OF DOCUMENTS USING LINK ANALYSIS, WITH REMEDIES FOR SINKS

CROSS-REFERENCE TO RELATED APPLICATIONS

The present application contains subject matter related to U.S. patent application Ser. No. 10/687,602 filed on Oct. 29, 2003, the entire contents of which are incorporated herein by reference.

BACKGROUND OF INVENTION

1. Field of Invention

The invention includes a method, system, and computer program product for ranking information sources which are found in a distributed network with hypertext links. In particular, the present invention relates to link-analysis-based ranking of hits from a search in a distributed network environment. The software/firmware implementations of the method constitute one component of a system for searching a distributed information system by way of link-analysis-based ranking of hits from a search in a distributed network environment. The methods are applicable to environment in which documents or other files are related by links, such as the Internet.

2. Discussion of the Background Art

FIG. 1 is a basic representation of the internet, showing the parts commonly used to build a search engine for the World-Wide Web (WWW). The crawler 1 collects information about web pages out on the WWW 2. All relevant textual information is fed into an inverted index 3, used as an off-line snapshot of the information available on the crawled part of the WWW. Information about the link structure—that is, which other web pages each web page is pointing to—is saved in a link database 4. When a user performs a search, she issues a search query 5, which is sent to the inverted index 3. The results from scanning the inverted index are an unprioritized list of hits. This hit list is then ranked according to text relevance 6 and link structure 7. The two ranking measures are then merged into one prioritized and ranked list 8, which is returned to the user originating the search query as a prioritized search result 9.

When the query results are obtained from the inverted index, they will in general contain hits/documents that reside on different WWW domains on the Internet. The documents' mutual way of making a reference (pointing) to each other, implicitly builds a directed graph. This directed graph consists of the documents as nodes and the hypertext links as directed edges, and it is this directed graph that is used in link-based ranking. Link-based ranking then evaluates "weight" or "importance" of the hits (documents), based not on their own content, but on how they are located in the larger information network (the directed graph).

Link-analysis-based ranking is useful in any context where the documents to be ranked are related by directed links pointing from one document to another, and where the links may be interpreted as a form of recommendation. That is, a link pointing from document u to document v implies that a user interested in document u may also be interested in document v. Link analysis allows one to combine, in a useful way, the information contained in all such 'recommendations' (links), so that one can rank the documents in a global sense. The outstanding example of this kind of approach is the application of GOOGLE's PAGERANK method to the set of linked documents called the World Wide Web.

There are several alternative ways of doing link-based ranking and finding document 'weights'. All methods are based on finding the principal eigenvector (eigenvector associated with the largest eigenvalue) of the graph's adjacency matrix A, in different modifications. GOGGLE's PAGERANK method (discussed below) obtains a ranking for each of the documents by computing the principal eigenvector of the transposed adjacency matrix with the columns normalized to unity. In the HITS method, due to Kleinberg (discussed below), two rankings are obtained: 1) the hub score is obtained by computing the principal eigenvector of the adjacency matrix composed with the transpose matrix of itself and 2) the authority score is calculated by obtaining the principal eigenvector of the transpose adjacency matrix composed with the adjacency matrix itself. However, there are no implementations that address rankings that arise from the unmodified adjacency matrix (used alone) and its transpose (also used alone).

The various methods for link analysis are most easily explained by defining two simple operators—F (Forward) and B (backward)—and their normalized versions, respectively f and b. In the spirit of a random walk, it is possible to imagine a certain weight (a positive number) associated with each node on a directed graph. The F operator takes the weight w(u) at each node u and sends it Forward, i.e., to all the nodes that are pointed to by node u. The B operator sends w(u) against the arrows, i.e., to each node that points towards node u. B is the adjacency matrix A, while F is its transpose f is the column-normalized version of F; it takes the weight w(u) at node u, divides it by the outdegree $k_{out,u}$ of node u, and sends the result $w(u)/k_{out,u}$ to each node pointed to by node u. Similarly, b is the normalized version of the backward operator B.

PAGERANK uses the f (normalized forward) operator, supplemented by the 'random surfer' operator (see below). The HITS method uses the composite operator FB to obtain Authority scores, and BF to obtain Hub scores. The present invention can be used with any operator which is subject to the problem of sinks—in particular, any of the basic operators F, B, f, or b.

One issue that all link-based ranking schemes must handle is the case of 'sinks' in the directed link graph structure. A 'sink' is a node, or a set of nodes, that has only links pointing into it, and no links pointing from the set of sink nodes to other nodes lying outside the set of sink nodes. Typically, sinks are composed of a set of nodes rather than one node; such a set is called a 'sink region'. Also, every node in a sink region will be termed a 'sink node'.

A problem with random walks on a directed graph is that they are easily trapped in sinks—regions of the graph that have a way in, but no way out. PAGERANK corrects for sinks by adding completely random hops (independent of the links) with a certain probability, while WISENUT corrects for sinks by employing a "page weight reservoir," which is a fictitious node connected bidirectionally to every other node in the graph. Sinks exist in general in distributed hypertext systems; hence every method involving random walks on the directed graph must deal with this problem somehow.

A different approach has been patented (U.S. Pat. No. 6,112,202, the contents of which are incorporated herein by reference) by Jon Kleinberg of Cornell University (USA), based on work done with IBM's CLEVER project. The algorithm is often called HITS ("Hypertext Induced Topic Selection").

There is no known problem with sinks in the HITS approach since, in applying either of the HITS operators BF or FB, one alternates between following the arrows (directed arcs), and moving against them. This approach, and variations of it, is addressed in several patents (e.g., U.S. Pat. Nos. 6,112,203, 6,321,220, 6,356,899, and 6,560,600, the contents of which are incorporated herein by reference).

A simple graph with 13 nodes (documents) is shown in FIG. 2. In FIG. 2, there are two sink regions: one sink region consists of the set of nodes (6,7,8) and the other sink region consists of the set of nodes (10,11,12,13). Any movement which only follows the arrows will be trapped in either of these sink regions, once it first arrives there.

The presence of sinks presents a significant practical problem for importance ranking by link analysis. The problem is that, for some approaches, sink nodes or sink regions can accumulate all the weight, while the other non-sink nodes (documents) acquire zero weight. This way it is not possible to obtain a stable, non-zero, positive distribution of weight over the whole directed graph. Without such a weight distribution, a meaningful ranking of documents becomes impossible. That is, documents are typically ranked, via link analysis, by computing a positive, nonzero 'importance weight' for each node—obtained from the principal eigenvector for the chosen modification of the adjacency matrix—and then using this 'link-analysis importance weight', along with other measures of importance (such as relevance of the text to the query), to compute an overall weight, which in turn gives a ranking of the documents. When there are sinks, the principal eigenvector is prone to having zero weight over large parts of the graph. Importance ranking based on such an eigenvector is not useful.

Mathematically, to say that a graph has sinks is equivalent to saying that the graph is not strongly connected. A directed, strongly connected graph is one such that, for any pair u and v of nodes in the graph, there exists at least one directed path from u to v, and at least one directed path from v to u. These paths do not necessarily run through the same set of graph nodes. More colloquially: in moving through a strongly connected graph, following the directed links, one can reach any node from any starting place. The existence of sink nodes, or sink regions, violates this condition: one can get 'stuck' in the sink, and never come out. Hence, any graph with sinks is not strongly connected, and so any remedy for the sink problem seeks to make the whole link graph strongly connected.

GOGGLE's PAGERANK algorithm remedies the sink problem by adding a link from each node to any other node. That is, for each node in the graph, to every other node there is added an outlink that is given a small weight. This modification is called the 'random surfer' operator, because it mimics the effects of a Web surfer who can, from any page (node), hop at random to any other page.

Conceptually, when the random surfer operator is used, the original link graph is perturbed by a complete graph structure. A complete graph is a graph that has a directed link from any node to any other node in the graph. The perturbation of the link graph by a complete graph results in a new graph that is also complete. The sink problem is thus solved—since the new graph is strongly connected—and one is thus assured a global ranking for all the nodes. However, this does not come without a price. The price paid is that the sparse structure of the link graph is sacrificed and replaced by a new perturbed graph, which is dense. This can lead to two possible types of problems: 1) The algorithm used to compute the ranking normally becomes more time consuming when the matrix is dense, and 2) the structure of the link graph is altered.

The first problem does not arise for the PAGERANK method. Because of the special (complete and symmetric) structure of the random surfer operator, its effects can be computed very easily. Hence the computation time of the PAGERANK algorithm is not significantly increased by the addition of the complete graph structure.

The second problem remains. Of course, it is not possible to change a non-strongly-connected graph to a strongly connected graph, without changing its structure somehow. However there is a real sense in which the PAGERANK modification is 'large'. That is: suppose the original graph is large—suppose it has a million nodes. (The number of documents in the World Wide Web is in the billions.) Then to say that the graph is 'sparse' is to say that the total number of links in the graph is roughly proportional to the number of nodes—in this case, some number times a million. (This number is the average node degree.) After performing the PAGERANK modification, however, the number of links is around a million times a million—about one trillion.

FIG. 3 illustrates the effect of the random surfer operator on the graph of FIG. 2. Here only the outlinks which are added to node 1 are shown. That is, after the addition of the random surfer links, node 1 has 12 outlinks rather than 2. Every other node in the graph will also have 12 outlinks. All the other random surfer links in FIG. 2 have not been drawn, simply to avoid visual clutter (there are 135 random surfer links in total for this graph).

In short, the PAGERANK sink remedy involves adding a potentially huge number of new links to the original graph. This change, while in some sense large, can at least be done in an unbiased fashion, by giving equal weights to all the added links. The presently disclosed methods also seek to make the graph strongly connected, also in an unbiased way, but by adding only a small number of links to the original graph.

Another algorithm, used by the WISENUT search engine (US patent application 2002-0129014), is somewhat similar to PAGERANK. The WISENUT method (termed WISENUT) also adds a large number of links, by connecting every node bidirectionally to a "page weight reservoir" (denoted R). This allows every node to reach every other; and in fact, in the algorithm, the two hops u→R→v are collapsed to one. Hence, topologically, this is the same as PAGERANK. However the probabilities of using the hops through R are different in the WISENUT rule—nodes with lower outdegree have a higher probability of using R. Nevertheless, it appears from the patent application that the non-sparseness of the resulting WISENUT matrix is manageable in the same way as that found in the PAGERANK matrix. Thus, the same advantages and disadvantages exist with WISENUT as mentioned above for PAGERANK.

A third approach to link analysis is by Jon Kleinberg (U.S. Pat. No. 6,112,202, the contents of which are incorporated herein by reference) of Cornell University (USA), based on work done with IBM's CLEVER project. The algorithm is often called HITS ("Hypertext Induced Topic Selection"). The HITS algorithm does not use the adjacency matrix directly; instead, it uses composite matrices, which are so structured as to not have sinks. Hence the HITS method may be said to include a method for avoiding the sink problem. However the composite matrices have their own problems. For one, they can give an 'effective graph' which has no connection between nodes which are linked in the original graph. In some cases this can lead to a connected original graph giving rise to a disconnected effective graph. There is no way to obtain a meaningful, global importance function for a disconnected graph; hence further assumptions or modifications are then needed in such cases.

The composite matrices will also connect many pairs of nodes which are not connected in the original graph. Hence there are many more nonzero entries in the composite matrices than there are in the original adjacency matrix. However, empirical studies suggest that these composite matrices are still sparse: in one example, where there were on average around 8 links for each node in the original adjacency matrix, there were found to be about 43 links in the effective graph for each node. Hence the HITS method appears to give a manageable numerical computation also.

Finally, the use of composite matrices has had little or no commercial use, while the non-composite PAGERANK approach has been enormously successful. In Applicants' own tests (unpublished), the HITS method gives rather poor results, while both PAGERANK and the method of U.S. patent application Ser. No. 10/687,602 gave good results. (In these tests, 'good results' means giving a high ranking to the best nodes.) Thus it seems that HITS and related methods, while mathematically elegant, do not give good performance in terms of ranking. One feature that is desired, as discovered by the present inventors, is an approach which does not rely on using composite matrices.

SUMMARY OF THE INVENTION

In view of the aforementioned short-comings of presently available schemes for hypertext link analysis, one objective of the present invention is to provide a rules-based method, and corresponding systems and computer based products, for ranking documents in a hyperlinked network.

As noted above, general directed graph structures are not strongly connected. In particular, they can have sink nodes and/or sink regions, which give rise to problems in performing link analysis. However, typical directed graphs have strongly connected components (SCCs). A strongly connected component is simply a set of nodes (usually not the whole graph) for which there is always a path from any node u to any other node v, as long as u and v are in the same SCC.

There are also links between different SCCs. These links are however invariably one-way. This is due to the fact that, if there were directed links in both directions between SCC_1 and SCC_2, then the two SCCs would in fact only be one.

The present invention offers two new ways of solving a technical problem which arises when one attempts to perform link-analysis-based ranking—namely, the problem of sinks. In particular, the present invention suggests two new approaches for solving the sink problem. These two approaches each have two desirable features:

They are suitable for use with non-composite matrices of any type (forward, backward, normalized, non-normalized).

They do not change the original, sparse graph to a dense graph. Instead, they modify the graph in a way that leaves it sparse.

Method 1 adds a small number of links to the original graph; and Method 2 adds no new links.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
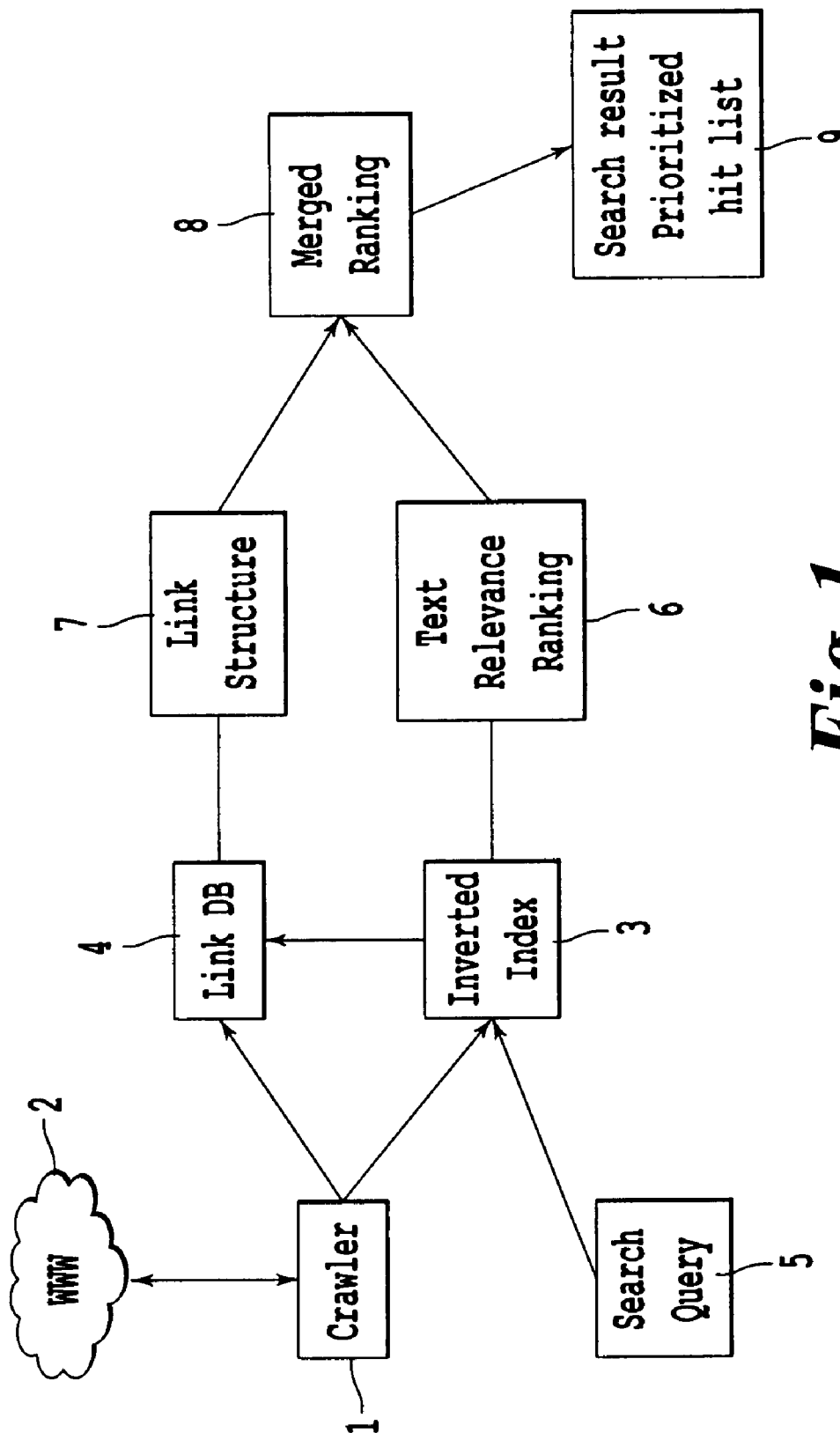
FIG. 1 depicts a generic search environment.

The present invention uses link analysis to compute node link-analysis weights LA(u) for each node u. For ranking purposes it is common practice to compute also a text relevance node weight TR(u) for each node. A final node weight W(u) may then be obtained as a weighted sum of these two weights:

$$W(u) = a \cdot TR(u) + b \cdot LA(u).$$

Since the weights W(u) are used purely for ranking, and only the ratio a/b has any effect on ranking, only one of the two parameters a and b is an independent tuning parameter.

The starting point for any method of link analysis, including that described in the present invention, is a directed graph, in which the nodes are information documents, and the links are pointers from one node to another. This graph is typically obtained by crawling or otherwise measuring the links among a set of linked documents. We will call this graph the 'measured graph'.

Often it is useful to edit the measured graph, according to various criteria having to do with quality control. For example, if it is determined that a large number of links have been made for the purpose of artificially raising the ranking of one or more documents, then these links may be removed to give a more accurate and fair ranking. Similarly, nodes may be removed; for example, if several nodes have nearly identical content, and lie in the same area of the document system—such that they may be viewed essentially as copies of one another—then all but one of such nodes may be removed. Of course, when nodes are removed, the links connecting to these nodes must also be removed.

We note that such editing invariably takes the form of pruning: the removing of nodes and/or links, to enhance the ability of the resulting hyperlinked graph to accurately represent the true structure of the set of linked documents. When the measured graph is pruned in this way, we call the resulting graph the 'pruned graph'.

Pruning may be performed at any stage in the link analysis. It is always possible to examine and prune the graph before beginning link analysis. However, it can also happen that the process of link analysis itself reveals quality information about nodes and/or links, which motivates further pruning. Hence pruning at any stage during link analysis is also possible, and often desirable. For these reasons, the present invention allows for pruning either before or during link analysis.

For simplicity of language, and in those cases where the distinction is not important, we will often use the term 'original graph' to refer either to the measured graph or to the pruned graph. The point here is that the present invention involves modifying the original graph so as to eliminate the problem of sinks. If no pruning has been performed, then the modification is applied to the measured graph; otherwise, to the pruned graph. The original graph is then precisely that graph that is modified by the methods of the present invention. Both the measured and the pruned graphs may be represented by a corresponding adjacency matrix. We use the convention here that 'the adjacency matrix A' refers to the adjacency matrix for the original graph. Each Method of the present invention modifies this matrix. For simplicity of notation, we denote, for either Method, the so-modified matrix as $M_{SR}$ (where 'SR' stands for 'sink remedies').

The present invention uses the concept of a 'metagraph' in order to find new ways of dealing with sinks. For any given directed graph, the metagraph is formed from the original graph as follows:

Find all the SCCs.

Replace each SCC with a single 'metanode'.

Links within SCCs are thus ignored.

Links between SCCs are retained unchanged. That is, a directed link from some node in SCC_a to some other node in SCC_b becomes a link from metanode a to metanode b.

The resulting metagraph has no cycles—that is (where directed links imply directed flows); the metagraph consists only of flows in one direction, from sources to sinks. Such a graph is called a 'directed acyclic graph' (DAG).

Figure 2:
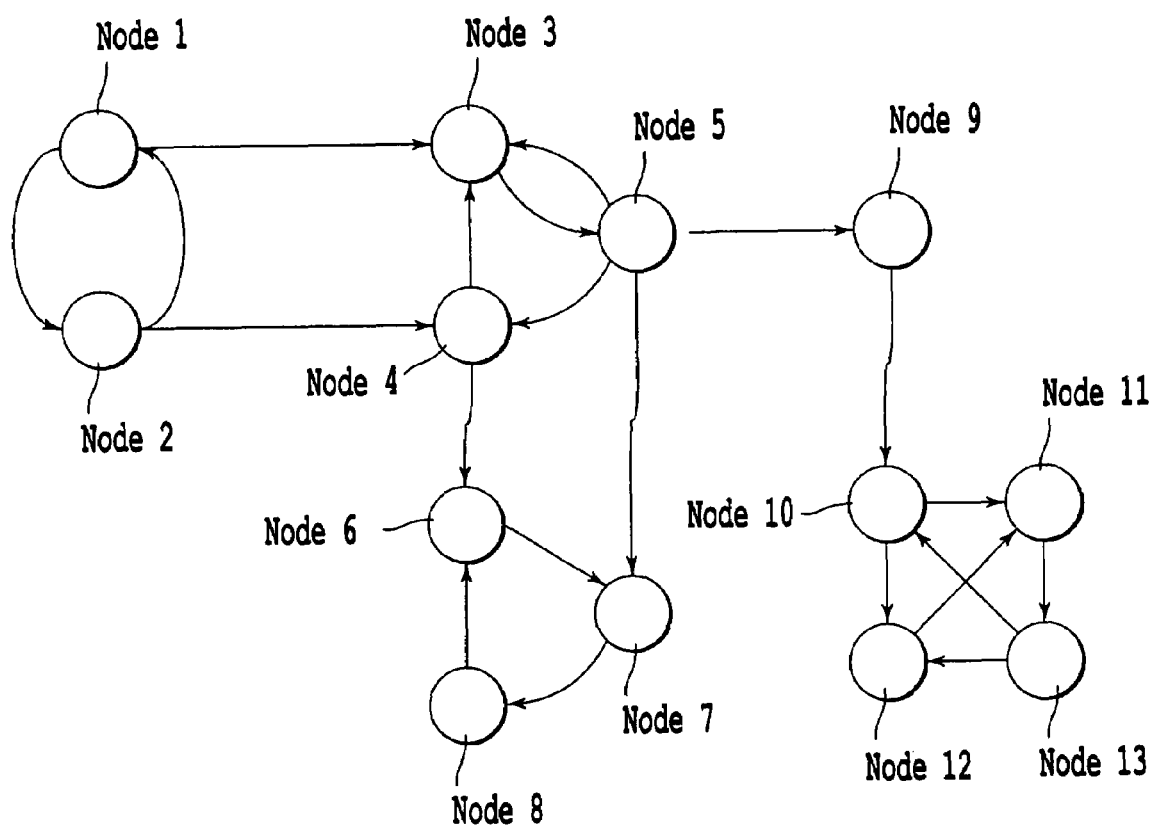
FIG. 2 depicts a sample graph with sink regions.
Figure 4:
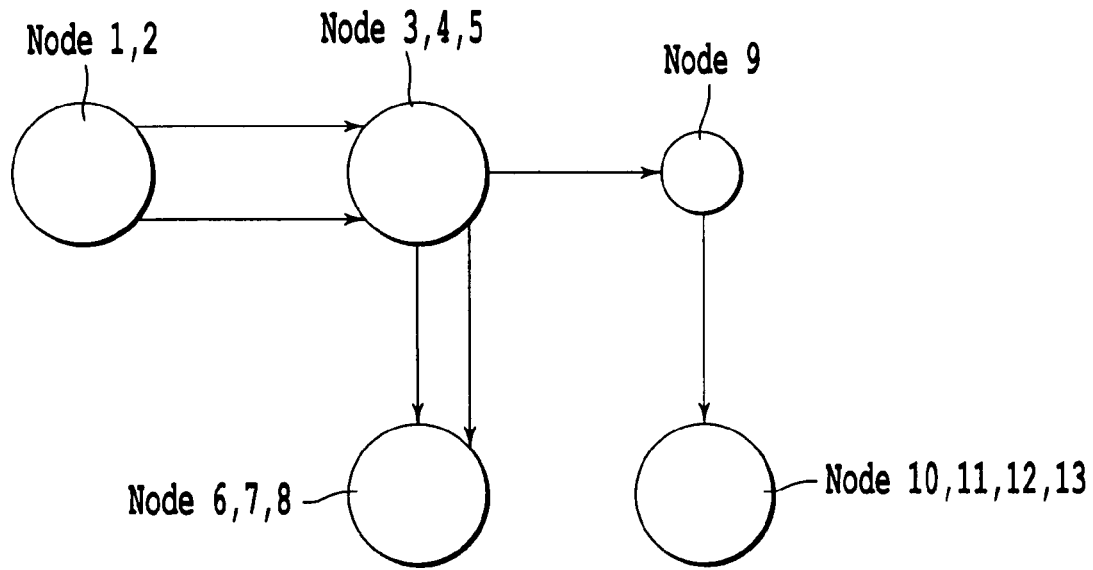
FIG. 4 depicts a full metagraph corresponding to the sample graph of FIG. 2.

The metagraph obtained from the sample graph of FIG. 2 is shown in FIG. 4. Here it is clear that any flows move in one direction—from the 'source regions' (1,2), via the 'intermediate regions' (3, 4, 5, 9), to the 'sink regions' (6,7,8) and (10,11,12,13).

Figure 5:
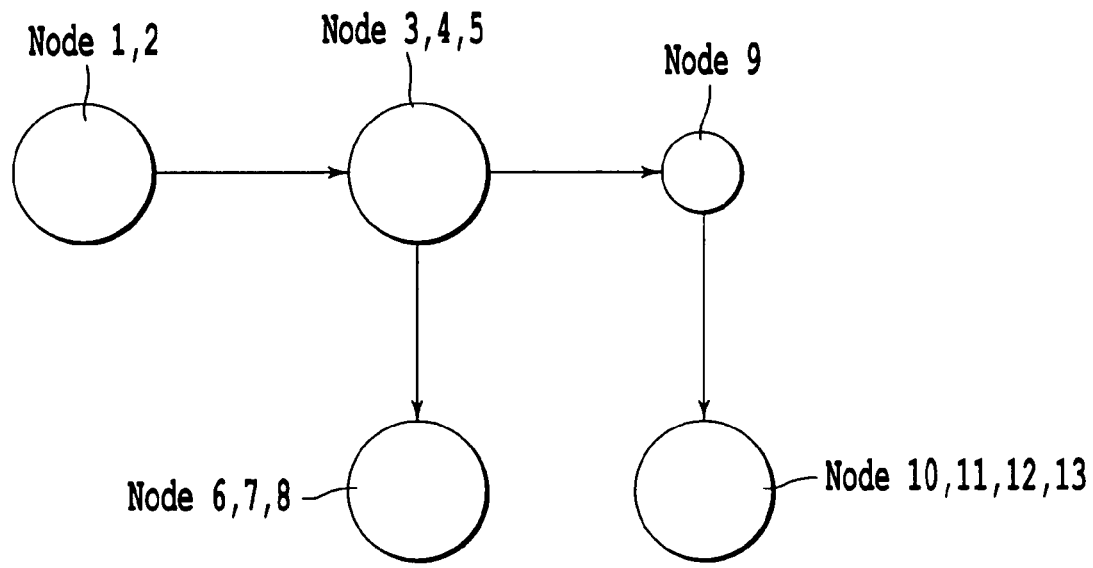
FIG. 5 depicts a collapsed graph corresponding to the sample graph of FIG. 2.

A closely related graph, called the "collapsed graph", is known in the standard literature. It is the same as the metagraph, except that it does not give information about all interSCC links. Instead, it simply gives the direction of all links (if any are present) between each pair of SCCs. Hence the collapsed graph is the same DAG as the metagraph, with however all parallel links between each pair of SCCs replaced by a single link. This distinction between a metagraph and a collapsed graph will be useful in the discussion below. The collapsed graph for FIG. 2 is shown in FIG. 5.

The present invention incorporates two new ways for solving the technical problem of sinks. Both of these new methods take the collapsed graph as their starting point. Hence we present the new solutions in three steps:

Finding the collapsed graph

Method 1 (reversing the links)

Method 2 (pumping the sources)

Finding the Collapsed Graph

Finding the SCCs of a directed graph is a solved problem, with standard algorithms available. An important aspect of this solution is that it is "linear in the size of the graph"—also denoted "of order N", or more compactly O(N). Here the "size of the graph" is taken to be the number of nodes (documents), i.e., N. This means that, as the graph grows large, the amount of time needed to solve this problem grows only linearly in the size of the graph (number of nodes, i.e., N). This slow growth of the SCC algorithm with graph size is crucial for the applicability of the presently disclosed methods to large graphs. Many document systems have a huge number of documents—for instance, the size of the World Wide Web is currently estimated to be about 4 billion documents. Hence any method to be applied to large graphs must not require computation or storage that grows too quickly with graph size N; and a linear O(N) growth is the current, acceptable, state of the art.

The calculation of node weights, by any method involving a sparse matrix, will require a computation time that grows at least linearly with the size of the graph. That is: node weight calculation requires repeated multiplication by the adjacency matrix. If the adjacency matrix is sparse, then the number of nonzero entries in it will be of O(N)—i.e., proportional to the number of nodes in the graph—and so each multiplication will require a time growing linearly with N. Then, if the number of iterations (multiplications) does not grow at all with the size of the graph, the total computation time will also grow linearly with N. There is evidence that the PAGERANK calculation needs a number of iterations that grows only weakly, if at all, with the size of the graph (see Efficient Computation of PAGERANK, by T. H. Haveliwala, *Stanford University Technical Report,* 1999, the entire contents of which are incorporated herein by reference). Therefore the PAGERANK calculation, and by inference similar techniques such as the method disclosed in U.S. patent application Ser. No. 10/687,602, may grow only linearly with the size of the graph.

In short: the time needed for node weight calculation grows linearly (or perhaps somewhat faster than linearly) with the number of nodes (graph size) N. Hence the additional calculation time needed to find the SCCs—which is known to grow only linearly with N—is entirely acceptable.

The storage requirements of the SCC-finding algorithm are also acceptable. For example, Tarjan's algorithm requires the storage of all the nodes, hence has storage needs of O(N). (See *Depth-first Search and Linear Graph Algorithms* by Robert E. Tarjan, SIAM Journal on Computing, 1(2):146-160, 1972, the entire contents of which are incorporated herein by reference). An improved version of Tarjan's algorithm needs even less storage. (See, *On Finding the Strongly Connected Components in a Directed Graph*, by Esko Nuutila and Eljas Soisalon-Soininen, Information Processing Letters 49 (1993) 9-14, the entire contents of which are incorporated herein by reference).

The metagraph incorporates not only information about all SCCs; it also includes all inter-SCC links. This further information is not typically available from standard algorithms. These give instead the "collapsed graph", which has (in common with the metagraph) all SCCs as metanodes. However the collapsed graph typically only gives one inter-SCC link for each pair of SCCs that are directly linked. (Compare FIG. 4, showing the full metagraph, with FIG. 5, showing the collapsed graph.) The collapsed graph thus shows the direction of flow between any two, linked, SCCs; but it does not give sufficient information for the methods of the present invention. Since the two disclosed methods require different kinds of additional information (beyond the collapsed graph), each method is discussed separately.

Method 1

Method 1 requires the full metagraph: it must know all inter-SCC links (as seen in the sample graph of FIG. 4), including their start- and end-points (obtainable from the full graph in FIG. 2).

Typically, the adjacency matrix for a sparse directed graph is stored as a list of ordered pairs. For example, if the link u→v is present in the graph, there will be a line in the list of the form: u v.

Suppose there are two SCCs, SCC_1 and SCC_2; and suppose one knows, from the collapsed graph (obtained from the standard algorithm), that they are linked. Suppose finally the link is as follows: SCC_1→SCC_2. Then one knows that all links between these two SCCs start in SCC_1 and end in SCC_2. One also knows (again from the standard algorithm) which nodes are in SCC_1 and which are in SCC_2. Hence one can scan the list of ordered pairs (i.e., the sparse adjacency matrix), finding all entries beginning with a node in SCC_1 and ending with a node in SCC_2. In the worst case, this will take a time equal to the number of links—which, for a sparse matrix, is proportional to the number of nodes, and hence is of O(N). If the adjacency matrix is sorted (which is typical)—so that all entries beginning with a given node u are grouped together—one will not generally need to search the entire list; but the time needed is in any case of O(N).

Hence there exists a simple algorithm, using time of O(N), for finding all inter-SCC links, and hence the full metagraph. Given the full metagraph, there is then no problem with adding the reverse of every inter-SCC link.

For example: suppose SCC_1 and SCC_2 have the following links joining them:

$$u_1 \rightarrow v_x$$

$$u_2 \rightarrow v_y$$

$$u_3 \rightarrow v_z$$

That is, each u-node is in SCC_1, and each v-node is in SCC_2. (Note that all links between these two SCCs run in the same direction—consistent with the assumption that SCC_1 and SCC_2 are two distinct SCCs.)

The presently disclosed method then proposes to make these two SCCs into a single SCC, by adding the following links:

$$u_1 \leftarrow v_x$$

$$u_2 \leftarrow v_y$$

$$u_3 \leftarrow v_z$$

Hence, in one embodiment of the invention, every inter-SCC link (i.e., every link in the metagraph) is supplemented with a reverse link. Here we recall that the metagraph is formed from the original graph, which may have been pruned. Hence the inter-SCC links in the metagraph may all be viewed as 'good' links; and so an unbiased approach is to reverse all of them.

In an alternative embodiment, only a subset of inter-SCC links is supplemented with a reversed link. That is, the problem of sinks is solved so long as at least one inter-SCC link is reversed for each pair of linked SCCs; and in some cases one can reverse even fewer inter-SCC links, and still make the whole graph strongly connected. There may arise occasions in which it is advantageous to exploit this flexibility, by only reversing a subset of the inter-SCC links.

Furthermore, it is possible to give these sink-remedying links a weight $\epsilon$, which can be adjusted to give the best performance. In one embodiment, the value of $\epsilon$ is held below that of the original links (which is typically one). In this way it is possible to avoid perturbing the original graph too strongly.

Again referring to FIGS. 2 and 6, which show the effects of Method 1 on a simple graph: each inter-SCC link is given a reversed partner; and no other new links are needed.

Finally, once the graph has been made strongly connected by Method 1, one can use any non-composite form of the adjacency matrix (forward or backward, normalized or not) to find the node weights and hence node rankings.

Figure 6:
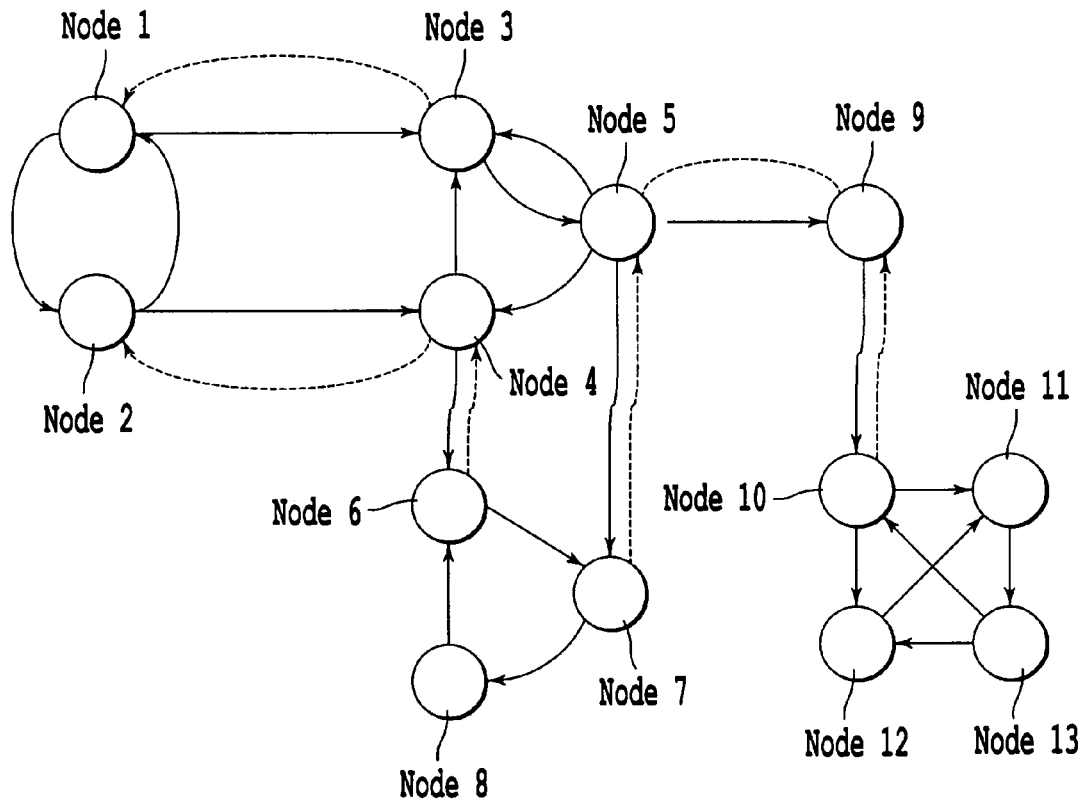
FIG. 6 depicts the effects of Method 1 on the sample graph of FIG. 2.
Figure 7:
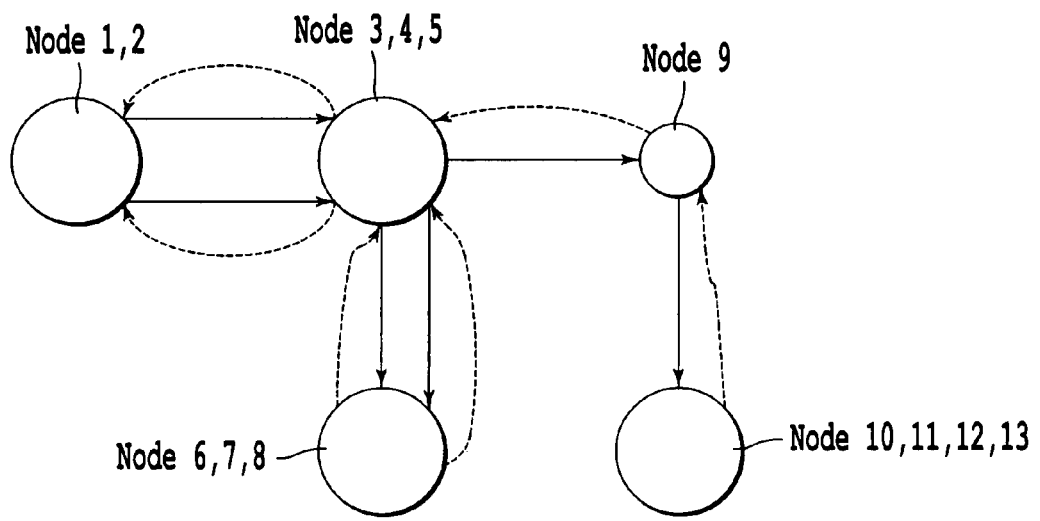
FIG. 7 depicts the effects of Method 1 on the metagraph shown in FIG. 4.

The effects of Method 1 on the sample graph of FIG. 2 are shown in FIG. 6. The added links are dashed. FIG. 7 shows the effects of Method 1 on the corresponding metagraph, whose unmodified form is shown in FIG. 4. FIG. 7 shows even more clearly that Method 1 needs only one new link for each inter-SCC link. That is, for this simple graph, Method 1 adds 6 new links, while the random surfer operator of PAGERANK adds 135 new links. This difference between the two methods becomes enormous for very large graphs.

Method 2

Method 2 needs slightly different information from that used by Method 1. Method 2, like Method 1, begins with the collapsed graph. Every such graph is a directed acyclic graph, or DAG. Such graphs always have at least one source and at least one sink. If weights are placed at the source (metanodes), and moved according to the direction of the arrows in the metagraph, these weights will flow from sources to sinks, leaving in general zero weight at any metanode other than the sink metanodes.

However, under the action of the graph adjacency matrix, the weights are amplified by a given factor. For normalized methods such as PAGERANK, this factor is less than or equal to one; while for non-normalized methods, such as the method of Canright and EngØ-Monsen disclosed in U.S. patent application Ser. No. 10/687,602, this amplification factor is generally greater than one. In either case, each SCC, viewed in isolation from all others (i.e., ignoring all inter-SCC links), has a given amplification factor or 'gain'.

If the 'gains' of all source SCCs in the metagraph were (i) equal, and (ii) greater than the gain of any other SCC, then the flow of weights can reach an equilibrium distribution, with positive weight at every node in the graph. In other words, when these two conditions hold, the dominant eigenvector of the adjacency matrix is positive everywhere. A proof of this statement may be found in Applicants' paper, Importance Functions for Directed Graphs, submitted to JACM on May 2, 2004, the entire contents of which are incorporated herein by reference.

In general, neither condition (i) nor condition (ii) holds. Method 2 forces both conditions to hold, by adjusting the weights on all links lying within the source SCCs. In so doing, one adjusts the gain of the source SCCs, until both conditions (i) and (ii) are met.

Method 2 then consists of the following steps:

First, one takes each SCC in the metagraph, and ignores all links connecting this SCC to any other SCCs. That is, each SCC is considered in isolation from the others. This method then needs, for each SCC, all intra-SCC links—all links internal to the SCC. These may be found by an O(N) procedure which is essentially the same as that used in Method 1 to find the inter-SCC links. This gives then the full adjacency matrix for each isolated SCC.

One then uses the desired form of the adjacency matrix (forward or backward, normalized or not) to compute the gain (dominant eigenvalue) of each (isolated) SCC. The choice of which matrix to use in this step is dictated by the matrix which is to be used for the entire graph in computing the importance eigenvector (see below). That is, the same matrix type must be used in each step.

Next, one determines which SCCs are source SCCs. This information is readily obtained from the collapsed graph, in a time less (typically much less) than O(N): source SCCs are those metanodes having only outlinks in the collapsed graph.

Suppose that, as is generally the case, there is more than one source SCC; that these source SCCs have unequal gains; and that at least one of the source SCCs has a gain that is less than the gain of some other SCC. The object is then to increase the gain of all source SCCs until the following two conditions are satisfied: (i) all source SCCs must have the same gain; and (ii) the common gain factor of the source SCCs must be greater than that of any other SCC.

In particular, suppose a given source SCC has gain g, and one wishes to increase its gain to G>g. In this embodiment there is a non-biased way of doing so, as follows: multiply all the original, internal link weights (which, again, are typically one) in the given source SCC, by the factor G/g. This simple change will give the desired effect. In the special case that the source SCC consists of a single node and hence has no internal links, one can add a 'self-link', pointing from the node to itself, and give that link a gain of G.

By choosing the same gain G for all source SCCs, while ensuring that G is greater than the gain of any other (non-source) SCC, conditions (i) and (ii) are fulfilled. Then, as shown in the preprint by the three inventors (cited below), the dominant eigenvector of the full, modified graph (with the only modification, as detailed here, being the adjustment of the internal link weights in all source SCCs) will be positive everywhere on the graph. Hence such an eigenvector may be used as an importance measure for the nodes.

The perturbation to the original graph may be held as small as possible, with this method, by making G only slightly larger than the largest gain g_max found among all the non-source SCCs.

It should be repeated here that the matrix which is used on the full, modified graph, to find an importance measure for the whole graph, must be of the same matrix type (forward or backward, normalized or not) as that which was used to find the gains of each isolated SCC.

In an alternative embodiment of the invention, the gain is adjusted (increased) only for a subset of the source SCCs. The general rule still holds however: the common gain G of the pumped source SCCs must be chosen so as to be larger than the unmodified gain of any non-pumped SCC—whether source or not. The effect of doing so—as shown in the preprint by the inventors—is to give zero weight to all nodes in non-pumped source SCCs. Also, any SCCs which depend (directly or indirectly) exclusively on non-pumped source SCCs for the flow of weight will also get zero weight. Nevertheless, for some source SCCs, it may be desirable to do this. For example, suppose a source SCC consists of a single node, pointing into one or more SCCs, and that these latter SCCs can get weight from other source SCCs. This single source node thus points into the rest of the graph (set of documents); but no document points to this node. Hence this node (document) may be judged to have very little importance with respect to the complete set of linked documents. Giving this one node a gain of G allows this small source SCC to inject as much weight into the graph as does any other source SCC. It may be that allowing such a small, nearly isolated SCC to inject so much weight is judged not to give the best results. Then, in the alternative embodiment of Method 2, one can choose not to pump some source SCCs—thus giving them zero weight in the resulting link analysis. For graphs with many such small, nearly isolated source SCCs, it may be advantageous to use Method 1 of the present invention, instead of using Method 2.

As noted above, choosing not to pump a source SCC has the result of giving the nodes in that source SCC zero weight. This means in turn that this SCC injects no weight into the rest of the graph. Hence non-pumped source SCCs may be considered as having been pruned from the graph. Furthermore, in the (perhaps unlikely) case that it is desirable not to pump a source SCC C_x—whose unmodified gain g_x is however greater than that of any other SCC in the graph—one is faced with two choices rather than one. That is, one can pump all other source SCCs to a gain G>g_x; or, one can simply prune the SCC C_x from the graph. The latter choice allows pumping the remaining source SCCs to a lower gain, hence giving a smaller modification of the original graph. Either of these choices has the effect of giving zero weight to the nodes in the non-pumped SCC C_x.

Figure 3:
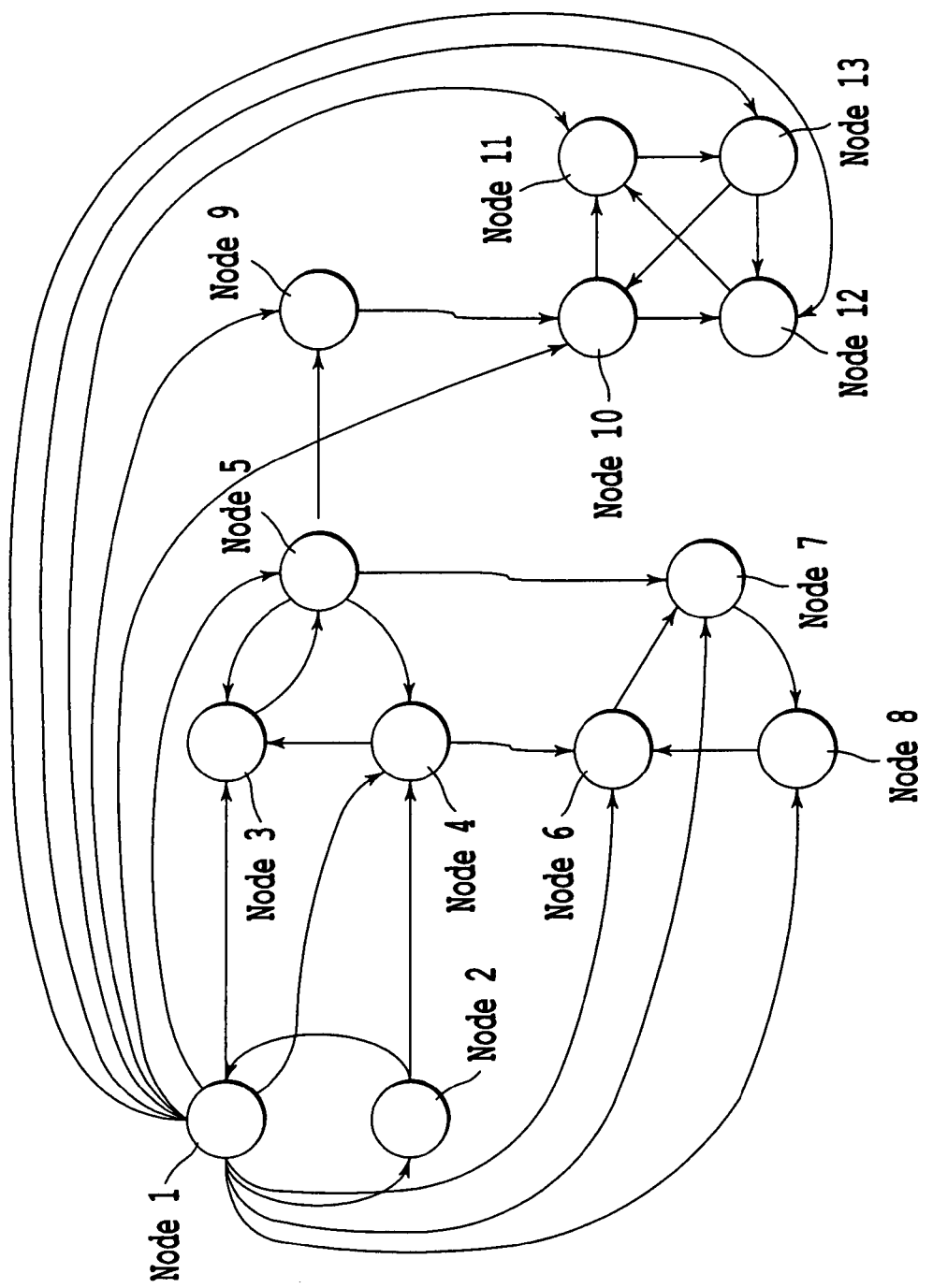
FIG. 3 depicts the effect of the random surfer operator on the graph of FIG. 2.

It may be desirable not to give zero weight to one or more SCCs which are 'downstream' of a non-pumped source SCC, and which furthermore depend exclusively on the non-pumped source SCC for weight. For example, if one judges the source SCC (1,2) in FIG. 3 to be unimportant, and chooses not to pump it, then the downstream SCC (3,4,5) (and in fact all other SCCs, in this case) will get zero weight. We can say that, in this case, failing to pump source SCC (1,2) makes the SCC (3,4,5) into an 'effective source'. More precisely: an SCC is an effective source if (i) it depends exclusively on non-pumped source SCCs for weight, and (ii) becomes a source SCC if the non-pumped source SCCs are pruned from the metagraph. This definition is useful, as it suggests another embodiment of Method 2: one can choose to pump any effective source, giving it a gain G according to the same criteria used for any other source SCC. That is, in FIG. 3, if one chooses not to pump the SCC (1,2), then one gains the option of pumping the SCC (3,4,5).

One further point should be clarified in regard to Method 2. That is, some approaches, such as the PAGERANK approach, use a normalized matrix (modified with a complete matrix as discussed above) to compute node weights. Normalizing a graph's adjacency matrix has the effect that all SCCs that are sinks have a gain of 1, while all other SCCs (including source SCCs) have a gain which is less than one. Hence Method 2 can only be applied to such cases at the expense of losing the strict normalization property—since, with Method 2, the gains of the source SCCs must be set to some value G which is greater than 1. The gain G however need only be slightly greater than one; hence one may consider that the change from strict normalization is small. It is in this sense that one can apply Method 2 to normalized as well as to non-normalized matrices.

Figure 8:
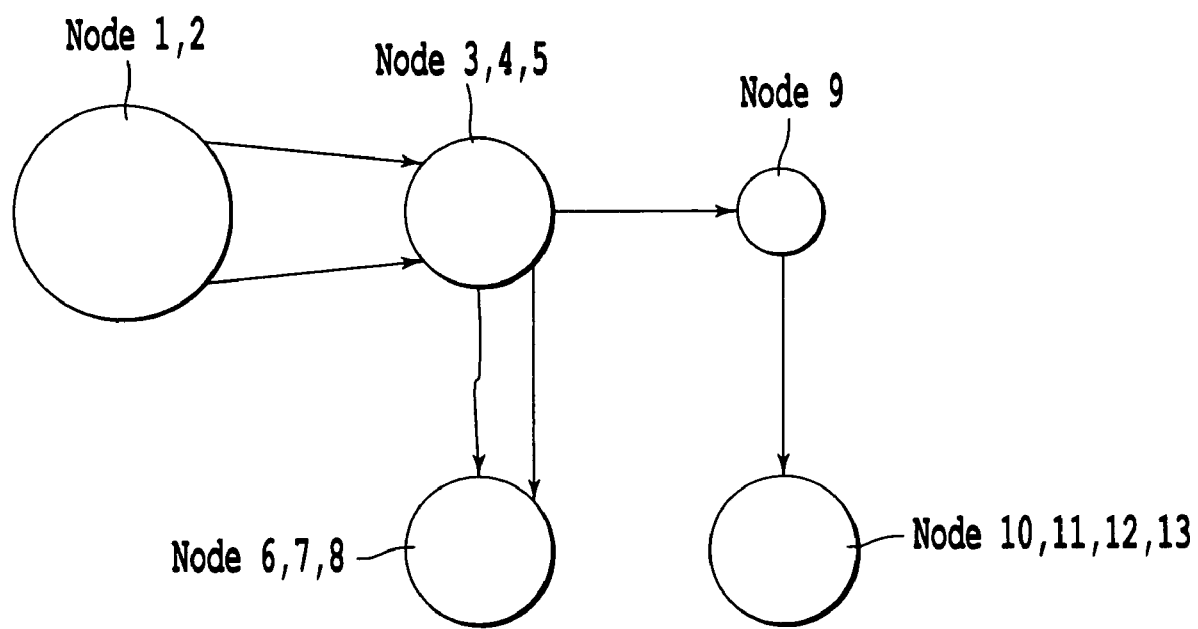
FIG. 8 depicts the effects of Method 2 on the metagraph shown in FIG. 4.

FIG. 8 illustrates the effect of Method 2 on the sample graph of FIG. 2. Note that no new links are added. Instead, the 'gain' of the single source region (1,2) is enhanced, as symbolized by the large, shaded circle for that region. For a general graph with multiple source regions, all would have the same, enhanced gain after the application of Method 2.

Personalization

There is currently much interest in "personalizing" search. That is, one seeks a search service which does not give the same answer to the same query for every user, but rather gives an answer which is in some useful way tailored to each user's interests. More briefly: for personalized search, the answer to the query should depend both on the query and on who is asking.

There are presently no clear leaders in the race for finding good ways to personalize search. Also, there exists a wide variety of approaches. Here one can focus on an approach which follows naturally and easily from the sink-remedy methods of PAGERANK and WISENUT, in order to point out that the sink remedies of the present invention also lend themselves readily to a similar type of personalization.

As noted above, both PAGERANK and WISENUT modify the given adjacency matrix in such a way that it becomes dense—in fact, it has links from all nodes to all nodes. However the added links are weighted in such a way that their effects can be expressed in terms of simply adding a list (vector) of weights to the result of multiplication by the original, unmodified adjacency matrix.

That is: suppose M is the desired form of the adjacency matrix, and M' is the matrix formed from the added links, so that the final form for the modified matrix is M+M'. The finding of weights for each node is then accomplished using repeated multiplication by the modified matrix. That is, a trial vector of weights x is repeatedly multiplied by the matrix M+M', until the weight vector converges to a stable pattern.

For both PAGERANK and WISENUT, the added-link matrix M' is of such a form that much or all of the multiplication may be done offline.

$$(M+M')x = Mx + s$$

That is, the supplemental vector of weights s may be computed without doing matrix multiplication with the dense matrix M'.

For the nonpersonalized versions of PAGERANK and WISENUT, the supplemental vector s adds the same weight to each node (document)—its main effect then being, as noted above, preventing weight from being trapped in sink regions. However a simple method for personalization presents itself: one can bias the supplemental vector s, and do so in a way that is customized for each searcher. For instance, if the searcher has an interest profile P, expressed (for example) as a list of keywords, with weights for each keyword, then each document u can be given a score P(u) (using known text relevance methods). This score expresses how well the document matches the user's profile, and need only be computed once for each user and each document. These scores can then be used to form a personalized supplemental vector: one can simply use the score P(u) for the $u^{th}$ entry of the supplemental vector. Use of such a personalized supplemental vector will lead to more weight being given to pages that have a higher score P(u), in the final (converged) weighting.

Thus the supplemental vector s, which appears in both the PAGERANK and the WISENUT methods, may be personalized, thus giving personalized search.

However, the above-described methods of the present invention for remedying the sink problem do not in themselves give rise to such a supplemental vector. In fact, few (Method 1) or no (Method 2) links are added to the original graph. Nevertheless, the presently disclosed methods also allow the use of scores of the form P(u), by exploiting the fact that it is possible to personalize weights on the links in the adjacency matrix itself. For example, suppose there is a link from document u (with score P(u)) to document v (with score P(v)). In link-analysis-based ranking, each link is viewed as a kind of recommendation. Hence, for personalized ranking, it is natural to weight the recommendation (the link) according to how well the "recommender" (u) matches the user's interests. Hence one can simply weight the link by the score P(u).

Another possibility is to make use of all the information that is available about the nodes' scores. That is, one can weight the link not only by the personal-interest score of the pointing node u, but also by the personal-interest score of the pointed-to node v. A simple way of doing so is to weight each link u→v by the sum (P(u)+P(v)).

Other variations are possible. Most generally, one can choose any monotonically-increasing function f(P(u),P(v)) of P(u) and P(v). A function f(x,y) is monotonically increasing in x and y if increasing either x or y (or both) gives the result that the function f also increases. Hence, in its most general form, the present invention allows for personalization of the link analysis, by weighting the links with a monotonically increasing function f(P(u),P(v)) of P(u) and P(v). We note that the computational burden of such personalization is simply that needed to compute the scores themselves. This burden is the same for any method which uses such scores.

Summarizing the above: each node (document) u can be given a personal-interest score P(u) to express how well the document matches an individual user's interests. The personal-interest score can then be used to bias the weights of links pointing from u to v. Every link u→v can be given the weight P(u); or, alternatively, every link u→v can be given the weight P(u)+P(v). Other rules are possible, reflecting the general rule that links get high weight if they point from and/or to nodes with high personal-interest scores. The resulting personalized adjacency matrix A*, with personalized weights on the links, can then replace the standard adjacency matrix A (consisting of 1's and 0's) as a starting point for link analysis. That is, the personalized adjacency matrix A* itself is the personalized Backward matrix B*; its transpose is the personalized Forward matrix F*; and the column-normalized versions of these are, respectively, the personalized normalized matrices b* and f*. Either Method 1 or Method 2 of the present invention may be applied to any of these personalized matrices.

In short: personal-interest scores for nodes can be used to reweight the links of the graph. Link analysis, using Method 1 or Method 2, then gives (via the principal eigenvector) node weights LA(u) which may be used to rank the nodes. The personal-interest scores P(u) for the nodes are a personalized starting point, and should not be confused with the final node weights obtained from link analysis.

Other forms of personalization may be combined with the present invention. In an alternative embodiment of the invention, the personal-interest scores P(u), suitably weighted, may be assembled into a personalized supplemental vector s. That is: we can set s(u)=αP(u), with α a tuning parameter. This vector may be added to the node weight vector x at each iteration of the multiplication process:

$$x_{new} = M_{SR} x_{old} + s.$$

Here $M_{SR}$ is the original matrix (in forward or backward, normalized or non-normalized form), modified with sink remedies as specified by Method 1 or Method 2. This equation is then iterated until the node weights x converge; the result then gives the link analysis weight LA(u).

This approach is equivalent to adding a complete graph to the modified original graph. Because of this fact, when using this form of personalization, one can in fact choose not to use the remedies of Method 1 or Method 2; instead one iterates as follows:

$$x_{new} = M x_{old} + s$$

using the unmodified original graph M, plus the supplemental vector as defined in the previous paragraph. This embodiment of the invention differs from PAGERANK in that it uses non-normalized operators: the M matrix is not column-normalized, and the supplemental vector s has no constraint on the sum of its entries. Hence this approach may be used to personalize link analysis based on the F or B operator, as described in the method of Canright and Engø-Monsen, disclosed in U.S. patent application Ser. No. 10/687,602

Once the constraint of column normalization is dropped, other forms of supplemental vector are possible. Specifically, one can let $$s(u) = \alpha \sum_v P(v) x_{old}(v);$$

and another possible choice is $$s(u) = \alpha P(u) \sum_v P(v) x_{old}(v).$$

All of these choices will converge to a positive set of weights, since they all represent a complete graph with positive weights on the links. Specifically—assuming that M=F, so that forward propagation of the weights is occurring—the choice s(u)=αP(u) represents a complete graph with weight αP(u) on all links pointing toward u; the choice $$s(u) = \alpha \sum_v P(v) x_{old}(v)$$

represents a compete graph with weight αP(u) on all links pointing from u; and the choice $$s(u) = \alpha P(u) \sum_v P(v) x_{old}(v)$$

represents a complete graph with weight αP(u)P(v) on all links between u and v. We note that any of these three choices may be used with any non-normalized form of the original matrix M, or of the modified matrix $M_{SR}$. The latter two choices (unlike the first) cannot be used with a normalized (weight-conserving) method such as PAGERANK. The reason for this is that the requirement that all the entries of s sum to a constant (which is needed for a normalized approach) is not possible for those two choices which involve a weighted sum of the entries of $x_{old}$ in the supplemental vector s.

In another alternative embodiment of the invention, the personal-interest scores P(u) are not used at all in the link analysis procedure. Instead, they are simply added to the node weights TR(u) for text relevance, and LA(u) from link analysis, to give a final node weight W(u) for each node:

$$W(u) = a \cdot TR(u) + b \cdot LA(u) + c \cdot P(u).$$

Here the coefficients a, b, and c are tuning parameters; but since the weights W(u) are used for ranking, only two of the three are independent tuning parameters.

Figure 9:
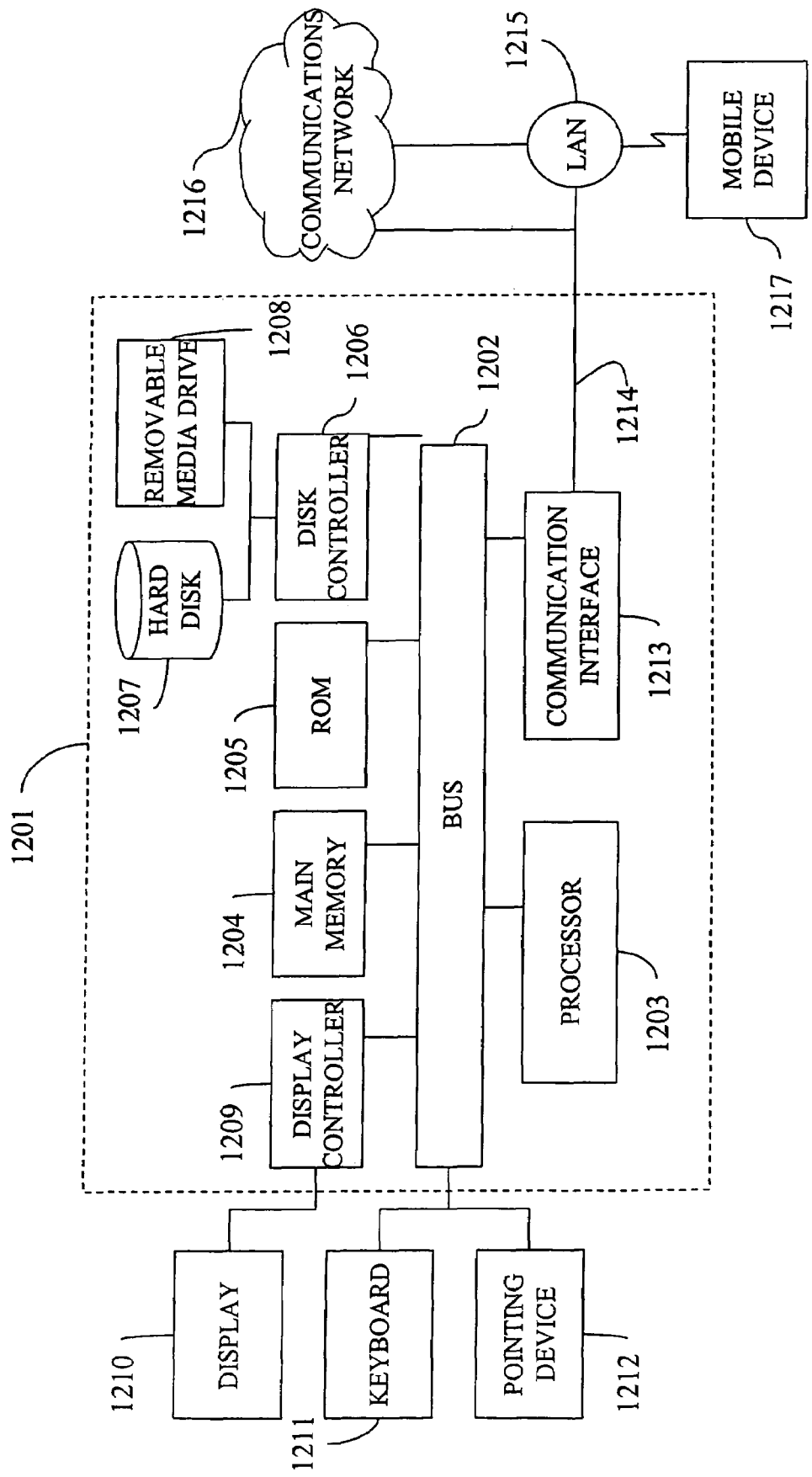
FIG. 9 is a block diagram of a computer system associated with the present invention.

FIG. 9 illustrates a computer system 1201 upon which an embodiment of the present invention may be implemented. Computer design is discussed in detail in STALLINGS, W., Computer Organization and Architecture, 4th ed., Upper Saddle River, N.J., Prentice Hall, 1996, the entire contents of which is incorporated herein by reference. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire, and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

Implementation of the invention for the purpose of ranking hits in a centralized Web search engine requires its integration with several other components: a text ranking system, an indexing system, a crawler, and a user interface. The invention, in this implementation, represents a part of a complete working search engine, and cannot be implemented in isolation from the other components of such a system.

The invention may also be implemented as part of a search engine operating over contents held on a single PC. This implementation requires the introduction of hyperlinks between all documents (mail, text, presentations, etc) stored on the PC (i.e., a "private Web".) This idea (hyperlinks between documents on a single PC) has only been realized to a very limited extent in present-day operating systems. Thus implementing the current invention as a part of the "private Web" would require modification of the many file-handling applications in a PC. In addition, an indexing system, a user interface, and (probably) a ranking system based on text relevance would be required.

Numerous modifications and variations of the present invention are possible in light of the above teachings. It is therefore to be understood that within the scope of the appended claims, the invention may be practiced otherwise than specifically described herein.

What is claimed is:

1. A computerized method for ranking documents using link analysis, comprising:

describing an original graph with a plurality of nodes and links, where said nodes represent information documents and said links represent pointers from one document to another;

forming a metagraph from said original graph by identifying a set of strongly connected components (SCC), replacing each SCC with a metanode, and retaining links between metanodes;

determining a gain for each SCC;

determining from said metagraph which SCCs are source SCCs;

increasing the gain of at least one source SCC by modifying an adjacency matrix representing link weights of the original graph, until the following three conditions are satisfied, thus creating a modified adjacency matrix:
(i) all source SCCs whose gain have been increased have a common gain;
(ii) the common gain is greater than that of any non-source SCC; and
(iii) said common gain is greater than a gain of any source SCC whose gain has not been so increased;

determining an importance measure for said plurality of nodes by performing a link analysis of said original graph using said modified adjacency matrix to compute link analysis node weights;

ranking two of the plurality of nodes with said importance measure; and one of outputting or displaying a result relating to said importance measure, wherein said step of determining the gain of each SCC comprises, for each SCC:

determining a second adjacency matrix representing intra-SCC link weights for a corresponding SCC; and determining a dominant eigenvalue of said adjacency matrix; and setting the gain based on said dominant eigenvalue.

2. The method of claim 1, wherein said step of increasing the gain of at least one source SCC by modifying an adjacency matrix of the original graph comprises, for each source SCC whose gain is to be increased:

determining a factor G/g, where G is the desired gain and g is the determined gain for that SCC; and multiplying all link weights in the second adjacency matrix for that SCC, and corresponding link weights in said adjacency matrix of the original graph, with said factor G/g.

3. The method of claim 2, further comprising:

performing said link analysis of said original graph with an operator that is based on the modified adjacency matrix of said original graph, said operator being of a same operator type as operators based on the second adjacency matrices of the SCCs and used to determine the gain of each SCC.

4. The method of claim 3, where said operator type is one of a forward and a backward operator, wherein said one of a forward and a backward operator is one of a normalized operator and a non-normalized operator.

5. The method of claim 1, wherein said step of retaining links between metanodes includes assigning a link from a node in a first SCC to a node in a second SCC as a link from a first metanode to a second metanode.

6. The method of claim 1, wherein the step of determining which SCCs are source SCCs includes determining whether an SCC has only outlinks in said metagraph.

7. The method of claim 1, further comprising:

determining a text relevance node weight for at least one node, wherein said step of determining said importance measure includes determining said importance measure for said at least one node as a weighted sum of said link analysis node weight and said text relevance node weight.

8. The method of claim 1, further comprising:

determining a personal interest score for at least one node in the original graph, said personal interest score being based on how well the information document represented by said node matches an individual user's interests; and in said adjacency matrix of the original graph, adjusting at least one link weight of a link pointing to or pointing from said node as a function of said personal interest score.

9. The method of claim 8, wherein said step of adjusting a link weight includes adjusting a link weight for a link u→v between nodes u and v, with respective personal interest scores P(u) and P(v), resulting in an adjusted link weight given by a function $f(P(u),P(v))$, where the function $f$ grows monotonically in P(u) and in P(v).

10. The method of claim 1, further comprising:

determining a personal interest score for at least one node in the original graph, said personal interest score being based on how well the information document represented by said node matches an individual user's interests;

forming a supplemental vector s, where for each node u having a non-null personal interest score P(u), a corresponding non-null entry in s is $s(u)=\alpha P(u)$, with $\alpha$ being a non-null tuning parameter; and obtaining a link analysis score vector x by iterating the equation: $x_{new}=Mx_{old}+s$ until convergence, wherein M corresponds to the modified adjacency matrix and x, $x_{new}$, M, $x_{old}$ and s are all non-null.

11. The method of claim 7, further comprising:

determining a personal interest score for at least one node in the original graph, said personal interest score being based on how well the information document represented by said node matches an individual user's interests; and determining said importance measure for said at least one node as a weighted sum of said link analysis node weight, said text relevance node weight, and the node personal interest score.

12. A computer storage medium storing a computer program containing instructions configured to cause a processor-based device to execute a method for ranking documents using link analysis, the method comprising:

describing an original graph with a plurality of nodes and links, where said nodes represent information documents and said links represent pointers from one document to another;

forming a metagraph from said original graph by identifying a set of strongly connected components (SCC), replacing each SCC with a metanode, and retaining links between metanodes;

determining a gain for each SCC;

determining from said metagraph which SCCs are source SCCs;

increasing the gain of at least one source SCC by modifying an adjacency matrix representing link weights of the original graph, until the following three conditions are satisfied, thus creating a modified adjacency matrix:
(i) all source SCCs whose gain have been increased have a common gain;
(ii) the common gain is greater than that of any non-source SCC; and
(iii) said common gain is greater than a gain of any source SCC whose gain has not been so increased;

determining an importance measure for said plurality of nodes by performing a link analysis of said original graph using said modified adjacency matrix to compute link analysis node weights;

ranking two of the plurality of nodes with said importance measure; and one of outputting or displaying a result relating to said importance measure, wherein said step of determining the gain of each SCC comprises, for each SCC:

determining a second adjacency matrix representing intra-SCC link weights for a corresponding SCC; and determining a dominant eigenvalue of said adjacency matrix"; and setting the gain based on said dominant eigenvalue.

13. The method of claim 12, wherein said step of increasing the gain of at least one source SCC by modifying an adjacency matrix of the original graph comprises, for each source SCC whose gain is to be increased:

determining a factor G/g, where G is the desired gain and g is the determined gain for that SCC; and multiplying all link weights in the second adjacency matrix for that SCC, and corresponding link weights in said adjacency matrix of the original graph, with said factor G/g.

14. The method of claim 13, further comprising:

performing said link analysis of said original graph with an operator that is based on the modified adjacency matrix of said original graph, said operator being of a same operator type as operators based on the second adjacency matrices of the SCCs and used to determine the gain of each SCC.

15. The method of claim 14, where said operator type is one of a forward and a backward operator, wherein said one of a forward and a backward operator is one of a normalized operator and a non-normalized operator.

16. The method of claim 12, wherein said step of retaining links between metanodes includes assigning a link from a node in a first SCC to a node in a second SCC as a link from a first metanode to a second metanode.

17. The method of claim 12, wherein the step of determining which SCCs are source SCCs includes determining whether an SCC has only outlinks in said metagraph.

18. The method of claim 12, further comprising:

determining a text relevance node weight for at least one node, wherein said step of determining said importance measure includes determining said importance measure for said at least one node as a weighted sum of said link analysis node weight and said text relevance node weight.

19. The method of claim 12, further comprising:

determining a personal interest score for at least one node in the original graph, said personal interest score being based on how well the information document represented by said node matches an individual user's interests; and in said adjacency matrix of the original graph, adjusting at least one link weight of a link pointing to or pointing from said node as a function of said personal interest score.

20. The method of claim 19, wherein said step of adjusting a link weight includes adjusting a link weight for a link u→v between nodes u and v, with respective personal interest scores P(u) and P(v), resulting in an adjusted link weight given by a function $f(P(u),P(v))$, where the function $f$ grows monotonically in P(u) and in P(v).

21. The method of claim 12, further comprising:

determining a personal interest score for at least one node in the original graph, said personal interest score being based on how well the information document represented by said node matches an individual user's interests;

forming a supplemental vector s, where for each node u having a non-null personal interest score P(u), a corresponding entry in s is $s(u)=\alpha P(u)$, with $\alpha$ being a non-null tuning parameter; and obtaining a link analysis score vector x by iterating the equation: $x_{new}=Mx_{old}+s$ until convergence, wherein M corresponds to the modified adjacency matrix and x, $x_{new}$, M, $x_{old}$ and s are all non-null.

22. The method of claim 18, further comprising:

determining a personal interest score for at least one node in the original graph, said personal interest score being based on how well the information document represented by said node matches an individual user's interests; and determining said importance measure for said at least one node as a weighted sum of said link analysis node weight, said text relevance node weight, and the node personal interest score.

* * * * *